United States Patent Office 3,341,622
Patented Sept. 12, 1967

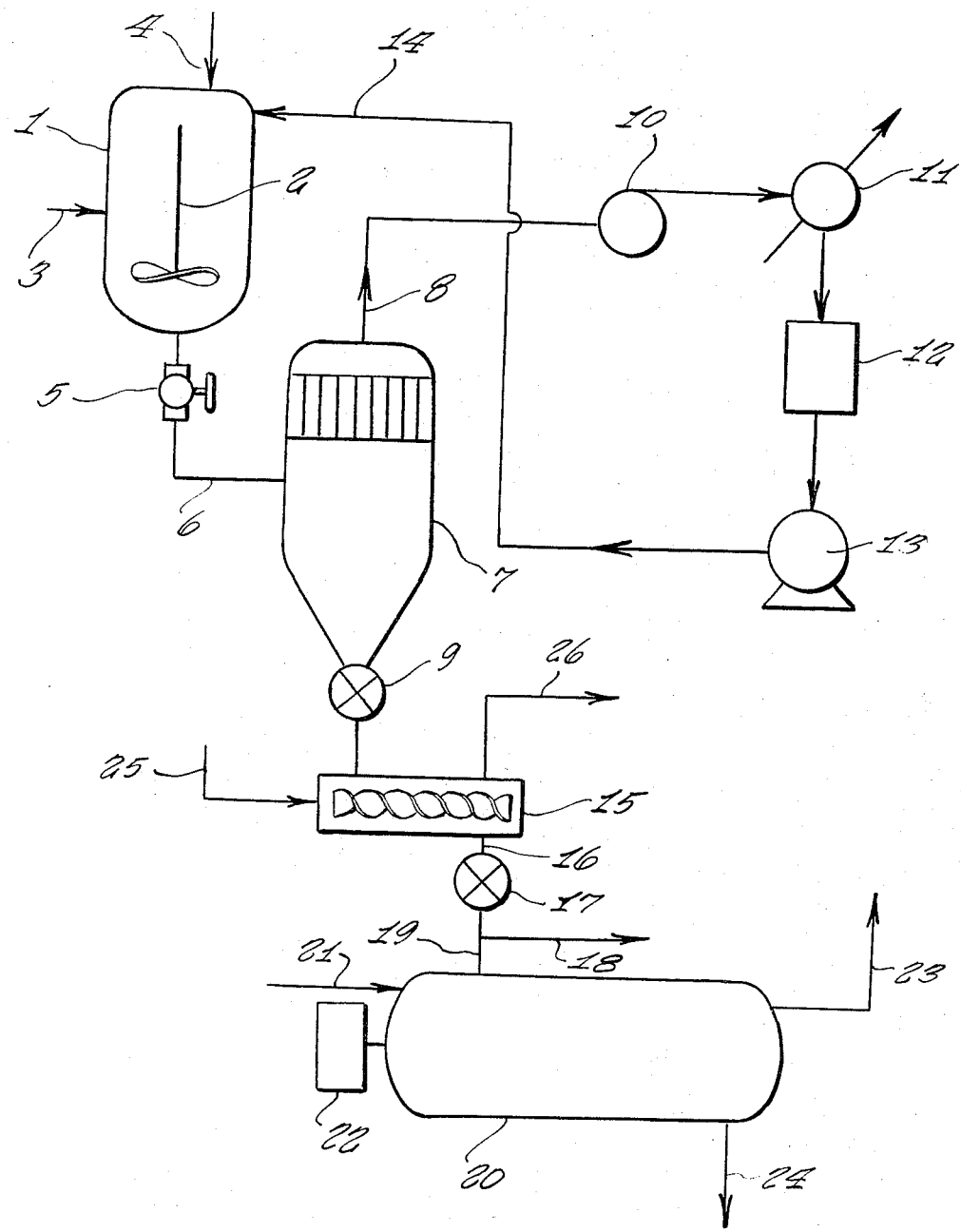

3,341,622
PROCESS FOR CONDUCTING A CONTINUOUS POLYMERIZATION REACTION
Irving Leibson, Odessa, Tex., and Blaine B. Kuist, Whittier, Calif., assignors to Rexall Drug and Chemical Company, Los Angeles, Calif., a corporation of Delaware
Filed Apr. 13, 1964, Ser. No. 359,187
8 Claims. (Cl. 260—878)

This invention relates to a process for conducting a continuous polymerization reaction and more specifically, for conducting a polymerization reaction of the type wherein a polymer slurry is formed in a polymerization zone and the slurry is subsequently separated into two phases, one a fluid phase comprising unreacted monomer and the other a solid phase comprising the polymerized product. The invention is specifically directed to an improvement for directly recycling unreacted monomer to the polymerization reactor and for maintaining a continuous polymerization reaction, as will be described hereinafter.

In polymerization reactions, specifically those involving polymerization of alpha-olefins, it has heretofore been known to continuously introduce a reactant monomer into a reaction zone to form a polymer slurry and to subsequently substantially continuously withdraw said polymer from the zone and flash the slurry in a lower pressure zone to obtain essentially two streams, one a vapor stream containing unreacted monomer and the other a polymer stream containing substantially dry polymer. In known processes of this type, the polymer is led to subsequent treatment steps which can consist of a deashing step wherein active catalyst residues are destroyed in a suitable vessel containing an alcohol, for example, or the polymer containing active catalyst residues is introduced to a vapor phase or a diluent type reaction zone wherein additional monomer is reacted onto the pre-formed polymer to form block copolymers. In either of these subsequent treatments, it has been found extremely difficult, if not impossible, to prevent volatile vapors from the subsequent treatment step from back-flowing to vessels upstream of these treatment steps. For example, where a polyolefin such as polypropylene is recovered from a low pressure flashing zone and is introduced either to a deashing vessel containing an alcohol, water or aqueous acid to deactivate and solubilize the catalyst or to a vapor or diluent type polymerization section where additional volatile monomers are polymerized onto the pre-formed polymer, volatile vapors from either the deashing section or the subsequent polymerization vessel back-flow to the low pressure flashing unit and thereby contaminate any subsequent recycle streams of unreacted monomer to the reactor. Not only do these vapor streams contaminate unreacted recycle streams, but they are usually very harmful to the polymerization system if allowed to remain in the streams which for economic reasons must be recycled to the polymerization reaction. Thus, ordinarily conversions in typical Natta-Ziegler alpha-olefin polymerization reactions are in the order of from 15 to 30% total solids, the remainder of the unreacted olefins being taken to storage and then to purification steps or directly to purification treatment and then reintroduced to the reaction zone. It has not been considered feasible heretofore to recycle unreacted monomers directly to the polymerization zone due to the nature of volatile impurities picked up in subsequent treatment steps after the polymerization reaction. Thus, ordinarily such recycle streams have to be taken to expensive purification steps which ultimately add to the cost of the polymer. Large savings could be realized in any alpha-olefin polymerization process if unreacted monomer could be taken from a polymerization reaction and recycled directly thereto without subsequent purification treatment.

An object of this invention is to provide a process for recycling an unreacted monomer directly to a polymerization reaction without a purification treatment.

A further object of this invention is to provide a continuous process for polymerizing an alpha-olefin wherein a polymerization slurry is taken from a reactor, flashed in a low pressure zone to obtain two streams, one a polyolefin polymer stream and the other containing an unreacted monomer stream and directly recycling the monomer stream without after-treatment purification steps to the reactor.

A still further object of this invention is to provide a process for continuously carrying out a polymerization and block copolymerization reaction in sequence, including a method for preventing the contamination of an unreacted monomer stream from a subsequent block polymerization reaction zone.

The objects above are accomplished in accordance with this invention by an improvement in a process for polymerizing an alpha-olefin monomer in a polymerization zone wherein there is formed an alpha-olefin polymer slurry comprising unreacted monomer and wherein said slurry is introduced to a separation zone maintained at a pressure lower than the polymerization pressure where unreacted monomer is flashed from said slurry leaving a substantially dry polyolefin polymer which is treated in a subsequent treatment zone with normally volatile catalyst-reactive components and wherein said unreacted monomer is recycled to said polymer zone, said improvement comprising a method for preventing contamination of said unreacted monomer with said volatile components and for condensing and recycling said unreacted monomer directly to the polymerization zone, comprising continuously withdrawing said polyolefin polymer from said operation and introducing it to one end of a confined zone, continuously advancing said polymer to the other end of said confined zone and to an outlet therefor and continuously introducing a sweep gas at other end of said confined zone and flowing it concurrently with the movement of the polymer to said other end of said confined zone.

As used in this specification and in the claims, an "alpha-olefin" is intended to mean a monomer such as ethylene, propylene, butene-1, pentene-1 and olefins containing up to 10 carbon atoms and including branched alpha-olefins such as 3-methyl-butene-1, 4-methyl-pentene-1, 4- and 5-methyl-heptenes-1 and the like. By the term, "normally volatile catalyst-reactive component" or "volatile component" is meant those ingredients reactive with the catalyst, such as alcohols or oxygenated compounds, as well as a monomer or monomers (for example, a monomer used in a block polymerization) which react with an active catalyst particle to form polymers. It will be understood that these volatile components, in most instances, will be deashing agents where the polymerization reaction is followed by such treatment or monomers which form block polymers on a preformed alpha-olefin polymer containing active catalyst residues when the polymerization reaction is followed by such treatment. As defined herein, normally volatile components also include those which are volatile under the conditions of the particular treatment in operation. Normally gaseous monomers or diluents are also included. Alcohols used in deashing operations, for example, paraffinic alcohols containing from 1 to 8 carbon atoms or more, such as methanol to octanol or higher are normally used in deashing operations, as well as polyhydroxy alcohols or, in general, oxygenated compounds which are useful in deactivation of catalysts such as the titanium salts activated with aluminum compounds. Oxygenated compounds such as alcohols are considered "contaminating" if they exceed 5 parts per million in an olefin recycle stream. Monomers used in block copolymerization reactions such as ethylene, butene-1, etc. are considered "contaminating" in a propylene polymerization reaction if they exceed 100 parts per million of a propylene recycle stream. The process of this invention eliminates these contaminating compounds or keeps the levels below 5 parts per million in cases involving deashing agents or below 100 parts per million in cases involving reacting monomers used in block copolymerization reactions.

By a "gaseous element, seal gas or sweep gas" is intended to mean a normally gaseous material which is inert to the reaction system such as argon or nitrogen or an active polymerizable monomer (which does not poison the catalyst) such as propylene or ethylene, but provided that such a monomer is similar to the monomer employed in the polymerization. This term also includes hydrocarbons, such as propane, butane and the like which can be normally used in the polymerization reaction as dispersing agents or diluents.

The attached drawing, which illustrates a preferred embodiment of the process of this invention, is to be taken in conjunction with the description herein for a full understanding of the process.

The polymerization process of this invention will be described with reference to the polymerization of propylene, although as previously understood, the invention is applicable to other alpha-olefins. The preferred polymerization reaction involving propylene is one wherein propylene is employed as the polymerizable monomer as well as the diluent for the polymerization reaction (bulk reaction). While propylene has been indicated as the preferred monomer and polymerization medium, the process is applicable, likewise, to those systems wherein an extraneous diluent (or mixtures of an extraneous diluent and liquid propylene) such as a normally gaseous material is condensed and is used as the polymerization medium. Examples of suitable normally gaseous diluents are propane and butane. It is preferred to employ volatile gases as diluent media in this embodiment of the process, since immediately following the polymerization reaction which is usually conducted at pressures above 150 p.s.i.g., the polymer slurry is let down in pressure to substantially atmospheric or a little above, for example, 25 p.s.i.g. in a low pressure zone (meaning a zone maintained at a pressure lower than that in the polymerization reaction) where due to the drop in pressure and the volatile nature of the polymerization ingredients, there is a flashing of these volatiles from the solid polymer. This flashing, which can be aided by heating, results in a polymer powder which is substantially dry and which by this term is to be understood a polymer containing 5% or less volatiles. The unreacted monomers, whether they be propylene and/or propylene and ethylene (in cases involving random copolymers), are taken overhead from this low pressure flashing zone and are condensed and recycled directly to the reactor.

Where the polymer slurry after the flashing step above is to be taken to a deashing vessel, deashing agent vapors will not back-flow to the flashing zone by virtue of the improvement in the process to be described below. Where the polymer is to be taken to a subsequent block polymerization reaction, the volatile monomers ordinarily used for such block polymerizations such as ethylene or butene-1 will likewise be prevented from back-flowing to the flashing vessel and contaminating the flashed ingredients. This invention, therefore, provides a method whereby contamination of flashed ingredients is eliminated, thereby making it possible at great savings in cost to directly recycle the flashed ingredients after condensation, to the polymerization vessel.

In propylene polymerization reactions with which this invention is specifically concerned, a suitable catalyst such as a titanium trichloride activated with an aluminum alkyl such as aluminum triethyl or diethylaluminum monochloride is contacted with liquid propylene in a reaction zone at temperatures of from 50° to 200° F. or above, but preferably temperatures below the melting point of the polymer formed or temperatures at which the polymer would go into solution in the polymerization media and pressures sufficiently high to keep the reactants in the polymerization zone in the liquid phase. Suitably, for propylene and/or normally gaseous diluents such as propane or butane, pressures of 150 p.s.i. and higher will maintain the reactants and/or diluents in liquid form. Total solids in the reaction zone, in accordance with this system, are ordinarily in the order of from 15 to 40%, although obviously lower or higher, for example up to 60% polymer solids can be achieved. In order, however, to efficiently handle the slurry, it is preferred to keep the polymerization to the percent solids above indicated. The reaction is continuous and propylene and catalyst are continuously introduced to the reaction system and substantially continuously withdrawn therefrom through a cyclic discharge valve which simulates continuous operation.

The Natta-Ziegler catalysts applicable to the polymerization of alpha-olefins, according to the preferred embodiment of this invention, are described in Belgian Patents 533,362, 534,792, 538,782 and 543,259. Hydrogen, as is known in the art, can be used to control the molecular weight of the polymer formed.

Reference is now made to the accompanying drawing which illustrates a preferred embodiment of the process of this invention. In the drawing 1 indicates a polymerization vessel equipped with a stirrer as indicated at 2. Liquid propylene is introduced continuously through line 3, while catalyst is introduced through line 4 either as a fully active composite or various lines (not shown) can be used to introduce the separate components. Cyclic discharge valve 5 is of the type that opens and closes continuously, so that slurry withdrawn from the vessel 1 emulates a continuous discharge operation. Line 6 conveys the polymer slurry which, due to the drop in pressure, is at this point substantially a gas and a solid to a combination cyclone-bag filter 7 maintained at from 0 p.s.i.g. to about 25 p.s.i.g. In the cyclone-bag filter combination a separation or flashing occurs with unreacted propylene monomer flashing overhead through line 8, while polymer powder is discharged through valve 9 for a further treatment as will be indicated below. The propylene vapor is taken via blower 10 to condenser 11, accumulator 12 and pump 13 where the monomer in liquid form is recycled directly to vessel 1 via line 14.

The polymer powder as discharged from the cyclone-bag filter combination 7 through valve 9 can be taken to one of two treatments: a deashing treatment or a block copolymerization reaction. Prior to either of these treatments, however, the polymer is dropped into a confined zone 15 which in the preferred embodiment of this invention is a screw feeder. The screw feeder 15 conveys the polymer powder to an exit 16, valve 17 and to either a deashing operation through line 18 or to a vapor phase copolymerization system through line 19. The vapor phase copolymerization system 20 can be a rotary kiln or any suitable vessel where the polymer is contacted with ethylene in the event an ethylene copolymer block is desired or propylene and ethylene in the event a random copolymer block is desired. As noted heretofore, a variety of reactive monomers can be used whether of the 1-olefin type or in general, ethylenically unsaturated type reactive monomers can also be used to form copolymer blocks and when any of these are employed, it becomes necessary to prevent their vapors from back-flowing to the cyclone-bag filter and thus contaminate the recycle stream. Propylene and/or ethylene (or, in general, an ethylenically unsaturated monomer) is introduced to reactor 20 through line 21 to contact the polymer from the screw feeder. Unit 22 is a driving gear to actuate paddles or ribbons in the reactor (not shown) for agitation of the vapor phase reaction system. Line 23 is for the eliminaation of unconverted gas from the vapor phase reaction system, while line 24 can lead directly to another vapor phase reaction zone or to a deashing vessel. Vessel 20 can be jacketed for heat transfer operation.

A feature of this invention involves the provision of a seal gas between the cyclone-bag filter and vapor phase reactor, said seal gas being introduced to one end of the screw feeder through line 25 and vented at the other end through line 26. The provision of this seal gas, which in the preferred embodiment of this invention is propylene (the monomer used in the polymerization reaction), serves the purpose of preventing any back-flow of ethylene or reactive monomer from the vapor phase reactor 20 or alcohol from the deashing unit (not indicated) via line 18. This seal gas introduced at a pressure slightly greater than any monomer or vapor pressure downstream, prevents contamination of units upstream of the introduction point as stated. Where a monomer such as propylene is used as the seal gas and polymerization reactant, then chances of contamination are even less as is obvious. The pressure of the introduced monomer to form the seal gas should be sufficient to cause flow of the vapor in a concurrent direction with the movement of the polymer in the screw feeder and to prevent or overcome back-flow of any volatile monomer or contaminant downstream of the introduction point. By using this sweep gas technique, therefore, and even if any propylene backtracks to the cyclone-bag filter combination, contamination is avoided and, in effect, a truly continuous operation can be provided with continuous and direct recycling of flashed monomer as indicated in the drawing. Note that utilizing this sweep gas technique also aids in removing volatiles from the polymer powder being conveyed in the screw feeder. The sweep gas, whether inert or a monomer similar to that being polymerized in vessel 1 can also be heated prior to introduction to zone 15 to thereby aid in removing any volatiles which might be left in the powder being conveyed and the powder subsequently taken to vapor phase copolymerization reaction zone 20.

In operation, reactor 1 is maintained at a pressure of approximately 250 p.s.i., cyclone-bag filter 7 at a pressure of about 0 to 25 p.s.i.g. and the seal or sweep gas is introduced to the screw feeder at a pressure within the range of from 1 to 23 p.s.i.g., but preferably from 18 to 23 p.s.i.g. Actually, the pressure of the sweep gas can readily be determined by reference to the volatile component vapor pressure in a deashing vessel or copolymerization reactor, and this pressure can then be exceeded by the sweep gas, thereby preventing diffusion or back-flow of such volatile components to the cyclone-bag filter.

In order to illustrate further the operation of the process herein, the following example is offered.

Employing a continuous bulk polymerization technique propylene is polymerized in reactor 1 to obtain about 30 percent total polymer solids. For this polymerization, a titanium trichloride and aluminum alkyl catalyst are employed at a polymerization temperature of about 150° F. and a pressure of about 250 p.s.i. The polymer solids slurried in unconverted liquid propylene are substantially continuously withdrawn from reactor 1 via valve 5 to line 6 where, due to the drop in pressure and expansion of the vapor, a vapor-solids composition is led directly to cyclone-bag filter 7 which is maintained at a pressure of about 0 to 25 p.s.i.g. Unreacted propylene monomer is readily flashed from the polymer in this unit, and due to the absence of contaminants from sources downstream of the cyclone-bag filter, is condensed and directly recycled to the reactor as heretofore explained.

The polymer powder from cyclone-bag filter 7 containing less than 5% volatiles is conveyed by rotary valve 9 to screw feeder 15. Propylene vapor is introduced through line 25 at a pressure of 18 to 23 p.s.i.g. depending on pressure in vessel 20, and flows concurrently with the powder being conveyed in unit 15 and is vented from this unit through line 26 for storage or further disposal. In this example, it is desired to form a 10 percent by weight ethylene copolymer block onto the preformed polypropylene containing active or live catalyst residues. The propylene polymer is dropped into reactor 20 for this purpose and ethylene is pressured in through line 21. Reactor 20 is maintained at a pressure of about 20 p.s.i.g. and a temperature of about 150° F. for this reaction. Residence time of the polymer and copolymerizable monomer is adjusted as known in the art to obtain the amount of ethylene incorporation desired and the formed block copolymer is thereafter taken to further processing areas. Ethylene from reactor 20 is prevented from back-flowing to cyclone-bag filter unit 7 by virtue of the sweep gas technique employed according to this process, and consequently the operation is continuously with unreacted propylene being recycled directly to reactor 1.

Having thus described this invention and illustrating its operation in a preferred embodiment thereof, it will be understood that various changes and modifications will be obvious to those skilled in the art.

What is claimed is:

1. In a process for polymerizing an alpha-olefin monomer in a polymerization zone wherein there is formed an alpha-olefin polymer slurry comprising polymer and unreacted monomer and wherein said slurry is introduced into a separation zone where unreacted monomer is separated from the polymer by a flashing operation thereby forming a gaseous recycle unreacted monomer stream and a substantially dry polyolefin polymer which is thereafter treated in a subsequent treatment zone with an oxygen-containing catalyst deactivating agent, the improvement for preventing contamination of said unreacted monomer with said reactive component and for condensing and directly recycling said condensed unreacted monomer to said polymerization zone which comprises continuously withdrawing said alpha-olefin polymer from said separation zone and introducing it to one end of a confined zone, continuously advancing said polymer to the other end of said confined zone and to an outlet therefor, and continuously introducing a sweep gas at one end of said confined zone and flowing it cocurrently with the movement of the polymer to said other end of said confined zone.

2. The process of claim 1 wherein the alpha-olefin monomer and the sweep gas are propylene.

3. The process of claim 1 wherein the polymerization is carried out in bulk.

4. The process of claim 3 wherein the alpha-olefin polymerized in bulk is propylene.

5. In a process for polymerizing an alpha-olefin monomer in a polymerization zone wherein there is formed an alpha-olefin polymer slurry comprising polymer and unreacted monomer and wherein said slurry is introduced into a separate zone where unreacted monomer is separated from the polymer by a flashing operation thereby forming a gaseous recycle unreacted monomer stream and a substantially dry polyolefin polymer which is thereafter treated in a subsequent treatment zone with a different reactive polymerizable monomer, the improvement for preventing contamination of said reactive component and for condensing and directly recycling said condensed unreacted monomer to said polymerization zone which comprises continuously withdrawing said alpha-olefin polymer from said separation zone and introducing it to one end of a confined zone, continuously advancing said polymer to the other end of said confined zone and to an outlet therefor, and continuously introducing a sweep gas at one end of said confined zone and flowing it cocurrently with the movement of the polymer to said other end of said confined zone.

6. The process of claim 5 wherein the alpha-olefin monomer and the sweep gas are propylene.

7. The process of claim 5 wherein the polymerization is carried out in bulk.

8. The process of claim 7 wherein the alpha-olefin polymerized in bulk is propylene.

References Cited

UNITED STATES PATENTS 3,193,360   7/1965   Scoggin _____ 260—94.9

FOREIGN PATENTS 132,546   1/1949   Australia.
601,560   1/1961   Italy.

MURRAY TILLMAN, *Primary Examiner.*
D. J. BREZNER, *Assistant Examiner.*